US 6,705,368 B2

(12) United States Patent
Glinz et al.

(10) Patent No.: US 6,705,368 B2
(45) Date of Patent: Mar. 16, 2004

(54) EMERGENCY SUPPORT MEMBER

(75) Inventors: Michael Glinz, Neustadt (DE); Silvia Kuhlmann, Hannover (DE); Andreas Dieckmann, Hannover (DE)

(73) Assignee: Continental Aktiengesellschaft (DE)

( * ) Notice: Subject to any disclaimer, the term of this patent is extended or adjusted under 35 U.S.C. 154(b) by 0 days.

(21) Appl. No.: 10/180,211

(22) Filed: Jun. 26, 2002

(65) Prior Publication Data

US 2002/0195183 A1 Dec. 26, 2002

(30) Foreign Application Priority Data

Jun. 26, 2001 (DE) .......................... 101 30 291

(51) Int. Cl.⁷ .............................................. B60C 17/04
(52) U.S. Cl. ...................... 152/400; 152/381.5; 152/516
(58) Field of Search .......................... 152/379.3, 379.4, 152/381.4, 381.5, 400, 401, 516, 520

(56) References Cited

U.S. PATENT DOCUMENTS

| | | | |
|---|---|---|---|
| 4,122,882 A | * | 10/1978 | Fisher et al. |
| 4,694,874 A | * | 9/1987 | White |
| 4,823,854 A | * | 4/1989 | Payne et al. ................ 152/382 |
| 5,435,368 A | * | 7/1995 | Lust ........................ 152/381.5 |
| 6,463,974 B1 | * | 10/2002 | Hellweg et al. ............ 152/400 |
| 6,463,976 B1 | * | 10/2002 | Glinz et al. ................ 152/520 |

FOREIGN PATENT DOCUMENTS

| | | |
|---|---|---|
| DE | 35 07 046 | 8/1986 |
| DE | 197 07 090 | 8/1998 |
| DE | 19745409 | * 4/1999 |
| DE | 198 25 311 | 12/1999 |
| EP | 0 130 136 | 1/1985 |
| GB | 2 082 129 | 3/1982 |
| JP | 633 12209 | 12/1998 |

OTHER PUBLICATIONS

Article, XP–000755094, no date.

* cited by examiner

Primary Examiner—Russell D. Stormer
(74) Attorney, Agent, or Firm—R W Becker & Associates; R W Becker

(57) ABSTRACT

An emergency support member is provided for a vehicle wheel and tire assembly having a pneumatic tire that is mounted on a wheel rim. The support member is embodied as a dished annular member within the tire, and has an emergency support surface for supporting the tire in the event of damage thereto. The annular member extends axially from the center of the rim and symmetrically over a portion of the width thereof. The annular member has a curved contour, with the two axially outer wall regions being supported upon the wheel rim via annular support elements. The dished annular member is embodied as a split ring that is not closed over its periphery, and is provided with a closure device for closing off the slit. The closure device includes two flanges that extend essentially radially inwardly relative to the rim. The closure device also includes at least one locking clamp for connecting the flanges.

5 Claims, 4 Drawing Sheets

EMERGENCY SUPPORT MEMBER

BACKGROUND OF THE INVENTION

The present invention relates to an emergency support member for a vehicle wheel and tire assembly having a pneumatic tire that is mounted on a wheel rim and essentially has a tread strip, two sidewalls, a carcass, reinforcing elements, as well as two tire beads that are provided with bead cores, whereby the emergency support member is embodied as a dished annular member within the tire and has an emergency support surface for supporting the tire in the event of damage thereto, whereby the dished annular member extends axially from the center of the rim symmetrically over a portion of the width of the rim, and when viewed in cross-section, axially outer portions of the annular member have a contour that is provided with first curvatures that are open toward the rim, and a central portion of its cross-section, between the curvatures that are open toward the rim, has a contour that is provided with a second curvature that is open toward the base of the tread strip, whereby the curvatures have one or more radii of curvature that uniformly merge with one another, and whereby the two axially outer wall portions of the dished annular member are supported upon the wheel rim via ring-shaped or annular support elements.

A one-piece emergency support member, i.e. a rim that is provided with such an emergency support member, is disclosed in DE-OS 35 07 046, whereby this known emergency support member is comprised of an outer metallic reinforcing ring, and a cushioning ring that is disposed between the reinforcing ring and the rim.

With such a one-piece configuration, the diameter of the metallic reinforcing ring is limited by the requirements for mounting an assembly. Although the outer diameter of such a one-piece ring should be as large as possible in order to achieve good emergency running characteristics, nonetheless this requirement is in conflict with the mounting conditions, according to which the metallic reinforcing ring must be introduced into the tire through the diameter of the cores. This core diameter refers to the diameter of the tire beads that contain the cores, and which correspond essentially to the diameter of the rim.

In addition, the manufacture of such a one-piece metallic reinforcing ring is relatively complicated and is generally effected by roll turning or cylindrical rolling (roll forming) of an annular blank, or by the annular welding of a coiled stock, whereby in each case this is a time and manufacturing intensive piece production.

It is therefore an object of the present invention to provide an emergency support member that, even with an optimized configuration over its cross-section, can be produced easily and reliably, is easy to mount or assemble in its final form, and permits a trouble-free connection with necessary support elements without cushioning rings, and that can be manufactured with the diameters, and can be mounted into the tires in a manner, that are optimum for an emergency rolling contact and not limited by the core diameter of the tire.

SUMMARY OF THE INVENTION

The inventive emergency support member, and a vehicle wheel and tire assembly having such an emergency support member, are characterized primarily in that the dished annular member is embodied as a split ring that is not closed over its periphery but rather is provided with a slit formed between two oppositely disposed ends of the dished annular member, and by a means or closure for closing off the slit, wherein such closure includes two flanges that are disposed on the oppositely disposed ends of the dished annular member that form the slit, wherein such flanges extend essentially radially inwardly relative to the wheel rim, and wherein the closure further includes at least one locking clamp for connecting the flanges.

As indicated, the dished annular member is first of all embodied as a ring, designated a split ring, that is not closed over its periphery. With such a configuration, an annular member that is provided with an optimized contour, and with an as large as possible diameter that is optimized for the rolling contact behavior in an emergency operating condition, can be introduced and mounted into the tire without difficulty. Due to the fact that the annular member is provided with a slit, it is possible to introduce the not yet closed off annular body into the tire via a helical mounting movement without being obstructed by the diameter of the core. The closing off of the annular member is effected only after introduction of the annular member into the tire.

By means of such a configuration, the annular member can advantageously also be produced in the form of a continuous screw from coiled stock in a continuous rolling process, for example by means of a 3-roller bending machine that is provided with appropriate complementarily embodied rollers. This endless screw is then cut in conformity with the required rim and tire circumferences, as a result of which individual slitted rings having the required diameter and the desired cross-sectional contour are produced.

The dished annular member is then provided with a device or closure for closing off the slit, with this device including two flanges that are disposed on the respectively oppositely disposed ends of the dished annular member that form the slit, with the flanges extending essentially radially inwardly relative to the wheel rim.

The flanges advantageously have base elements or regions that are adapted to the contour of the annular member and via which the flanges are connected with the annular member, for example by a multiple spot welding or by a seam weld. The flanges could also be provided with support plates that additionally protect the locking clamp from bending out or up under load.

The dished annular member is furthermore provided with at least one locking clamp that connects the flanges. The locking clamp is advantageously embodied as an essentially U-shaped clamp, the legs of which, in the installed state, extend radially outwardly relative to the wheel rim, and extend about those side surfaces of the flanges that are remote from the slit. As a consequence of such a configuration, even in the region of the slit or connection, the dished annular member has a stability that is readily suitable to absorb the high stresses or loads that occur during an emergency running operation.

Pursuant to one advantageous embodiment of the present invention, the closure means is provided with securing and/or connecting means between the flanges and the locking clamp that are preferably embodied as bolts that connect the flanges and clamp. Such bolts can have various configurations and can be secured in various ways, for example by being welded with the clamp and/or the flanges, or by being securely seated by means of spring or snap rings. Also advantageous for securing the bolt are spring clips or clamping springs that engage in an appropriate circumferential groove of the bolts. By using such spring clips or clamping springs, the emergency support member is easy to install and again remove.

Pursuant to a further and particularly advantageous specific embodiment, the dished annular member (split ring), which is embodied as a ring that is not closed over its periphery, has a slit that forms an angle of up to 50° relative to the axis of the dished annular member, and hence also to the axis of the rim. With such a configuration, the high transverse forces in the region of the edges of the split that act upon the annular member, for example when driving through curves in an emergency running operation, are reliably transferred or dissipated without producing excessive stress peaks for the individual components. In particular, such an angular arrangement of the slit significantly reduces a difference in rigidity in the construction of the emergency support member under the stress of emergency or flat tire operation.

Further specific features of the present invention will be described in detail subsequently.

BRIEF DESCRIPTION OF THE DRAWINGS

The objects and advantages of the present invention will appear more clearly from the following specification in conjunction with the accompanying schematic drawings, in which.

DESCRIPTION OF PREFERRED EMBODIMENTS

Figure 1:
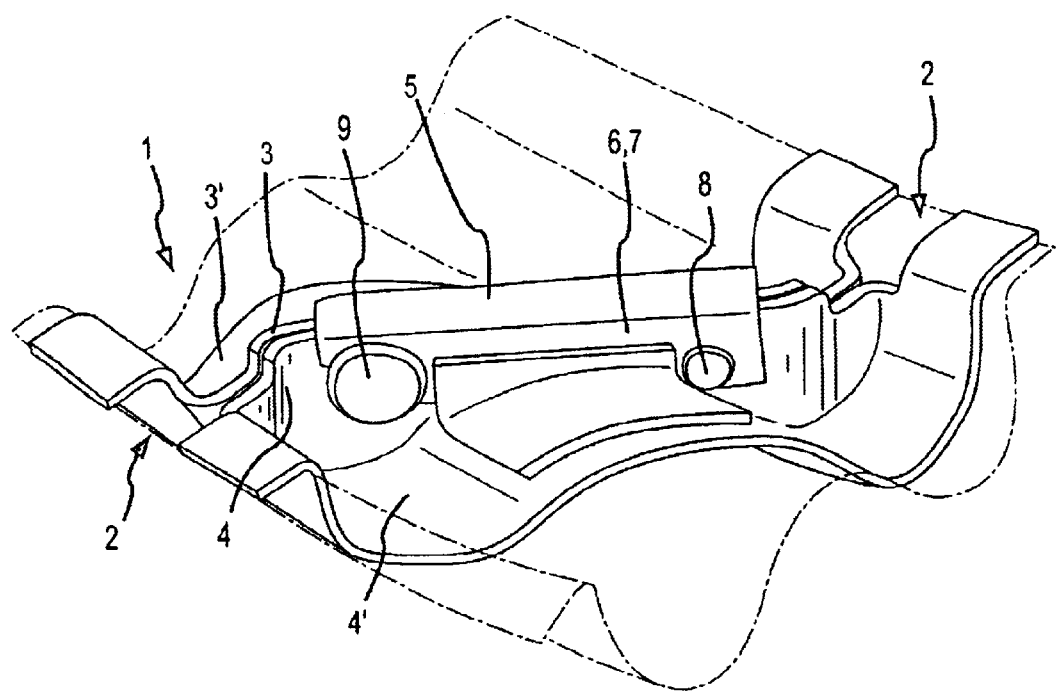
FIG. 1 is a perspective view, in a finish installed state, of a portion of a dished annular member in the region of the slit with pertaining flanges and locking components, whereby the slit is inclined at an angle of 30° relative to the rim axis.

Referring now to the drawings in detail, FIG. 1 shows an emergency support member 1 that is embodied as a dished ring or annular member that in turn is embodied as a split ring and has a slit 2 that forms an angle of 30° relative to the axis of the dished annular member, and hence also to the axis of the wheel.

On the respectively oppositely disposed ends of the dished annular member 1 that form the slit 2, flanges 3 and 4 are welded or fused on that extend essentially radially inwardly relative to the wheel rim, which is not illustrated in this view.

The flanges 3 and 4 merge into base elements or regions 3' and 4' that are adapted to the contour of the annular member and via which the flanges are connected with the annular member, for example in this embodiment by a non-illustrated seam weld.

The flanges 3 and 4 are connected by a locking clamp 5, which is embodied as an essentially U-shaped clamp, the legs 6 and 7 of which, in the installed state, extend radially outwardly relative to the wheel rim and extend about the flanges 3 and 4 on those side surfaces thereof that are remote from the slit.

The lock is completed by securing and connecting means that are embodied as bolts 8 and 9 and extend between the flanges 3 and 4 and the locking clamp 5. The bolts of the illustrated embodiment are connected to the clamp and the flanges by a plurality of spot welds.

Figure 2:
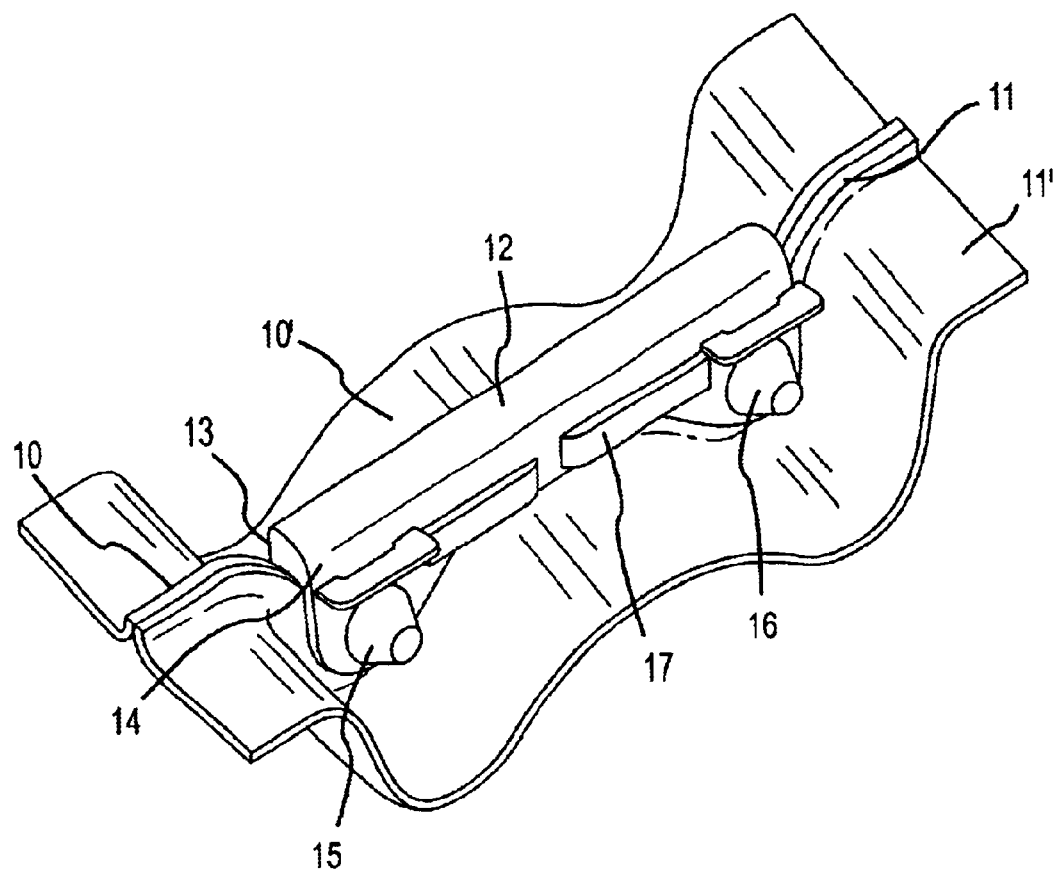
FIG. 2 shows a further device (lock) for the closing off of the slit in the finished assembled state, with a slit angle of 9° being provided.

FIG. 2 shows a further embodiment of a device (lock) for the closing off of the slit in the final assembled state, which essentially differs from the embodiment shown in FIG. 1 in that in this embodiment the dished annular member is designed with a slit angle of 9° and the bolts are secured in a different manner.

Also with this embodiment one can recognize the flanges 10 and 11 that are welded or fused onto the respectively oppositely disposed ends of the here not illustrated dished annular member, which ends form the slit. Again, the flanges 10 and 11 extend essentially radially inwardly relative to the wheel rim, which in this view is also not shown.

The flanges 10 and 11 again merge into base elements or regions 10' and 11' that are adapted to the contour of the annular member and via which the flanges are connected with the annular member, in this embodiment by a non-illustrated seam weld.

The flanges 10 and 11 are connected by a locking clamp 12, which here also is embodied as an essentially U-shaped clamp, the legs 13 and 14 of which, in the installed state, extend radially outwardly relative to the wheel rim and extend about those side surfaces of the flanges 10 and 11 that are remote from the slit.

This lock is completed by securing and connecting means that are embodied as bolts 15 and 16 and extend between the flanges 10 and 11 and the locking clamp 12. The bolts of this embodiment are secured via a spring clip or clamping spring 17 and thus connect the flanges and the locking clamp.

Figure 3:
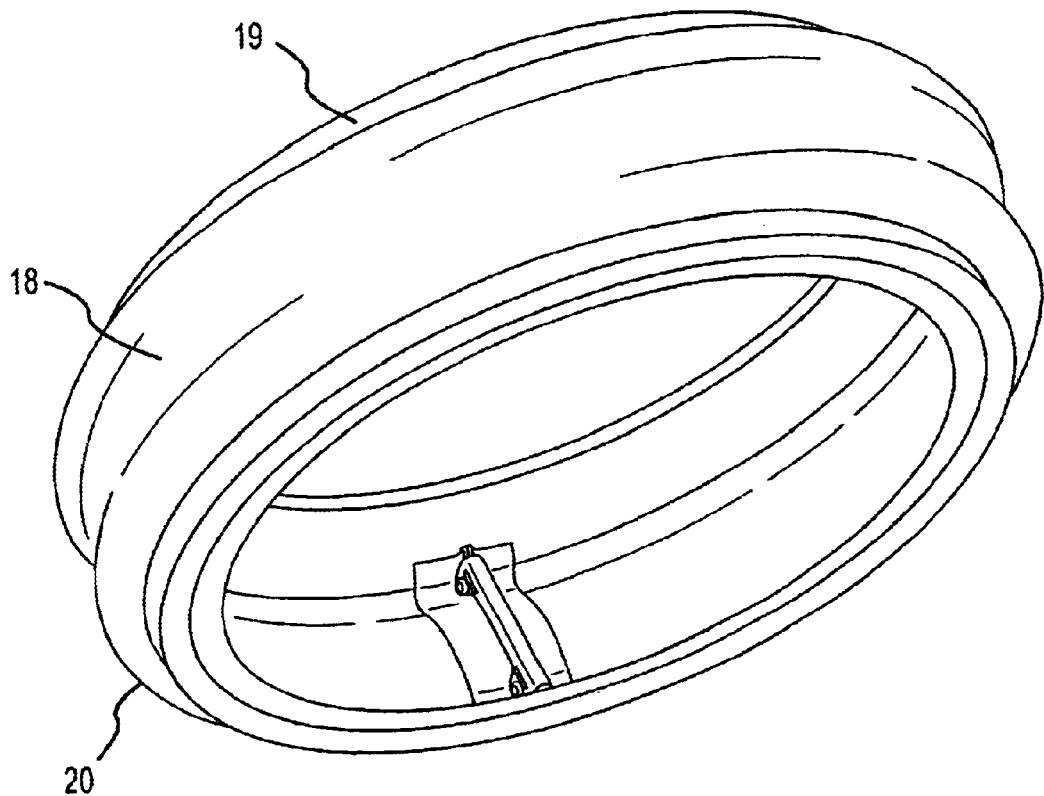
FIG. 3 shows an emergency support member with a dished annular member having a slit inclined by 9°.

FIG. 3 shows an emergency support member having a dished annular member 18 that is provided with a slit that is inclined by 9°. The two axially outer wall regions of the annular member 18 are supported on the non-illustrated wheel rim via ring-shaped support elements 19 and 20 of rubber that are vulcanized on.

Disposed in the lower portion of the emergency support member is the lock or clamp illustrated in FIG. 2.

Figure 4:
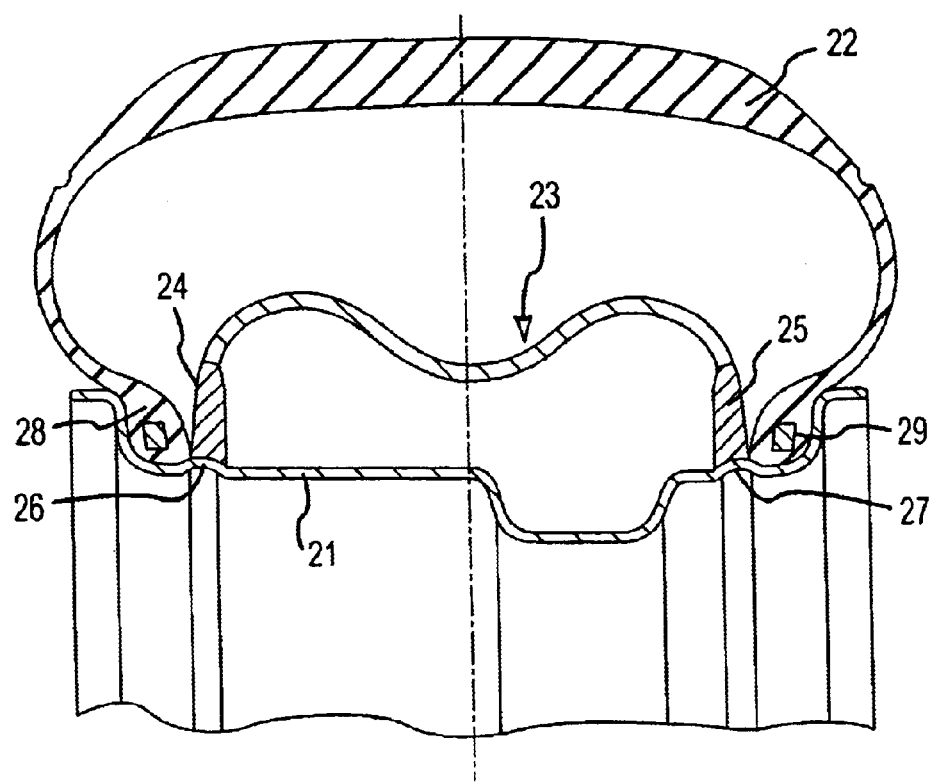
FIG. 4 is a partial cross-sectional view of a wheel and tire assembly having a wheel rim, tire and installed emergency support member.

FIG. 4 shows a partial cross-sectional view through a wheel and tire assembly having a wheel rim 21, the tire 22, and the installed emergency support member 23, which in this assembled example is respectively additionally supported in the region of the rim humps 26 and 27 by ring-shaped or annular support elements 24 and 25 upon the wheel rim 21. In this connection, the annular support elements 24 and 25 are disposed against respective tire beads 28 and 29.

The specification incorporates by reference the disclosure of German priority document 101 30 291.6 filed Jun. 26 2001.

The present invention is, of course, in no way restricted to the specific disclosure of the specification and drawings, but also encompasses any modifications within the scope of the appended claims.

We claim:

1. An emergency support member for a vehicle wheel and tire assembly having a pneumatic tire that is mounted on a wheel rim and essentially has a tread strip, two sidewalls, a carcass, reinforcing elements, and two tire beads that are provided with bead cores, said emergency support member comprising:

a dished annular member adapted to be disposed within a tire to provide an emergency support surface for supporting said tire in the event of damage thereto, wherein said dished annular member is adapted to extend axially from a central area of a rim and symmetrically over a portion of a width of said rim, wherein when viewed in cross-section, axially outer portions of said dished annular member have a contour including first curvatures that are open toward said rim, and a central portion of said dished annular member has a contour, between said first curvatures, that includes a second curvature that is open toward the tread strip of said tire, wherein said curvatures have one or more radii of curvature that uniformly merge with one another, and wherein said two axially outer wall portions of said dished annular member are adapted to be supported on said rim via annular support elements, and wherein said dished annular member is a split ring that is not closed over its periphery but rather is provided with a slit formed between two oppositely disposed ends of said dished annular member; and means for closing off said slit, wherein said means includes two flanges disposed on said oppositely disposed ends of said dished annular member that form said slit, wherein said flanges extend essentially radially inwardly relative to said rim, and wherein said means further includes at least one locking clamp for connecting said flanges, wherein said locking clamp is an essentially U-shaped clamp having legs that in an installed state extend radially outwardly relative to said rim and extend about said flanges on side surfaces thereof that are remote from said slit.

2. An emergency support member according to claim 1, wherein said means for closing off said slit furthermore includes means that extend between said flanges and said locking clamp and serve for at least one of securing and connecting.

3. An emergency support member according to claim 2, wherein said securing or connecting means are embodied as bolts that connect said flanges and said locking clamp.

4. An emergency support member according to claim 1, wherein said slit of said dished annular member forms an angle of up to 50° relative to an axis of said annular member.

5. The emergency support member of claim 1 in combination with a vehicle wheel and tire assembly.

* * * * *